United States Patent
Guo et al.

(10) Patent No.: US 10,333,308 B2
(45) Date of Patent: Jun. 25, 2019

(54) TWO-LEVEL PREDICTIVE BASED REACTIVE POWER COORDINATION AND VOLTAGE RESTORATION FOR MICROGRIDS

(71) Applicant: NEC Laboratories America, Inc., Princeton, NJ (US)

(72) Inventors: Feng Guo, Santa Clara, CA (US); Ratnesh Sharma, Fremont, CA (US); Siqi Wang, Knoxville, TN (US)

(73) Assignee: NEC Corporation, Tokyo (JP)

(*) Notice: Subject to any disclaimer, the term of this patent is extended or adjusted under 35 U.S.C. 154(b) by 90 days.

(21) Appl. No.: 15/635,928

(22) Filed: Jun. 28, 2017

(65) Prior Publication Data

US 2018/0048154 A1 Feb. 15, 2018

Related U.S. Application Data

(60) Provisional application No. 62/375,031, filed on Aug. 15, 2016.

(51) Int. Cl.
| | |
|---|---|
| *H02J 3/16* | (2006.01) |
| *H02J 3/38* | (2006.01) |
| *H02J 3/14* | (2006.01) |
| *G06N 7/00* | (2006.01) |
| *H02J 13/00* | (2006.01) |
| *H02J 3/00* | (2006.01) |

(52) U.S. Cl.
CPC .............. *H02J 3/16* (2013.01); *G06N 7/005* (2013.01); *H02J 3/14* (2013.01); *H02J 3/383* (2013.01); *H02J 3/385* (2013.01); *H02J 3/386* (2013.01); *H02J 13/0006* (2013.01); *H02J 2003/003* (2013.01); *H02J 2003/007* (2013.01); *Y02E 10/563* (2013.01); *Y02E 10/58* (2013.01); *Y02E 10/763* (2013.01); *Y02E 40/34* (2013.01); *Y02E 40/72* (2013.01); *Y04S 10/123* (2013.01)

(58) Field of Classification Search
CPC ........ H02J 3/00; H02J 3/12; H02J 3/18; H02J 3/36; H02J 3/38; H02J 3/40; H02J 3/46
USPC .......... 307/84, 82, 80, 66, 64; 700/291, 290, 700/293, 298
See application file for complete search history.

(56) References Cited

U.S. PATENT DOCUMENTS

| | | | | |
|---|---|---|---|---|
| 9,472,954 | B2* | 10/2016 | Piyabongkarn | H02J 3/32 |
| 2008/0278000 | A1* | 11/2008 | Capp | H02J 3/04 |
| | | | | 307/21 |

(Continued)

OTHER PUBLICATIONS

Bidram et al., "Secondary control of microgrids based on distributed cooperative control of multi-agent systems." IET Generation, Transmission Distribution. Aug. 2013. pp. 822-831.

(Continued)

*Primary Examiner* — Fritz M Fleming
*Assistant Examiner* — Jagdeep S Dhillon
(74) *Attorney, Agent, or Firm* — Joseph Kolodka (57) ABSTRACT

A computer-implemented method for controlling voltage fluctuations of a microgrid including a plurality of distributed generators (DGs) is presented. The computer-implemented method includes collecting, by a resiliency controller, measurement data from the microgrid, using a model predictive control (MPC) module to distribute reactive power to each of the DGs of the microgrid, and using a droop based controller to guide operation of each of the DGs of the microgrid.

20 Claims, 7 Drawing Sheets

(56) References Cited

U.S. PATENT DOCUMENTS

| | | | | |
|---|---|---|---|---|
| 2013/0073109 | A1* | 3/2013 | Cheng | H02J 3/40 |
| | | | | 700/298 |
| 2013/0079939 | A1* | 3/2013 | Darden, II | H02J 13/0013 |
| | | | | 700/291 |
| 2015/0054339 | A1* | 2/2015 | Zhao | H02J 3/16 |
| | | | | 307/24 |
| 2016/0363949 | A1* | 12/2016 | Zimmanck | G05B 13/021 |
| 2017/0077700 | A1* | 3/2017 | Sun | G05B 17/02 |
| 2017/0317498 | A1* | 11/2017 | Guo | G05B 15/02 |
| 2018/0138705 | A1* | 5/2018 | Gu | H02J 3/12 |

OTHER PUBLICATIONS

He et al., "Consensus-based distributed cooperative control for microgrid voltage regulation and reactive power sharing," IEEE PES Innovative Smart Grid Technologies, Europe. Oct. 2014. pp. 1-6.

Micallef et al., "Secondary control for reactive power sharing in droop-controlled islanded microgrids," 2012 IEEE International Symposium on Industrial Electronics (ISIE). May 2012. pp. 1627-1633.

Shafiee et al., "Distributed secondary control for islanded microgrids—a novel approach," IEEE Transactions on Power Electronics. Feb. 2014. pp. 1018-1031.

* cited by examiner

TWO-LEVEL PREDICTIVE BASED REACTIVE POWER COORDINATION AND VOLTAGE RESTORATION FOR MICROGRIDS

RELATED APPLICATION INFORMATION

This application claims priority to Provisional Application No. 62/375,031, filed on Aug. 15, 2016, incorporated herein by reference in its entirety.

BACKGROUND

Technical Field

The present invention relates to power systems and, more particularly, to a two-level predictive based reactive power coordination and voltage restoration system for microgrids.

Description of the Related Art

The intermittent and non-dispatchable nature of most renewable sources such as photovoltaic (PV) and wind brings new challenges to operation and control of a microgrid. For example, large amounts of PV integration may cause voltage rise issues due to reverse power flow when PV generation exceeds load demand. Additionally, wind and PV are usually operated in maximum power point tracking (MPPT) mode to achieve maximum power generation. However, availability of maximum power can be influenced by, e.g., weather conditions. Abrupt weather condition changes may cause severe voltage variations or even a voltage collapse. The voltage variation issue is more severe in islanded microgrids since no reactive power support can be obtained from the main grid. Thus, voltage control becomes a significant issue for secure operation of microgrids, especially in islanded microgrids.

The basic idea behind voltage control is reactive power compensation. Traditionally, fossil-fuel generators such as diesel generators with direct AC connections are used as the main source to provide reactive power support since it is more reliable. However, with more and more diesel generation being replaced by renewable generation, it may be insufficient at some point in time. When demand is high, it needs a large amount of active power output from diesel generation, thus limiting the available reactive power. Besides, the use of diesel generator involves high emission and high fuel cost.

SUMMARY

A computer-implemented method for controlling voltage fluctuations of a microgrid including a plurality of distributed generators (DGs) is presented. The method includes collecting, by a resiliency controller, measurement data from the microgrid, using a model predictive control (MPC) module to distribute reactive power to each of the DGs of the microgrid, and using a droop based controller to guide operation of each of the DGs of the microgrid.

A system for controlling voltage fluctuations of a microgrid including a plurality of distributed generators (DGs) is presented. The system includes a memory and a processor in communication with the memory, wherein the processor is configured to collect, by a resiliency controller, measurement data from the microgrid, use a model predictive control (MPC) module to distribute reactive power to each of the DGs of the microgrid, and use a droop based controller to guide operation of each of the DGs of the microgrid.

A non-transitory computer-readable storage medium comprising a computer-readable program for controlling voltage fluctuations of a microgrid including a plurality of distributed generators (DGs) is presented, wherein the computer-readable program when executed on a computer causes the computer to perform the steps collecting, by a resiliency controller, measurement data from the microgrid, using a model predictive control (MPC) module to distribute reactive power to each of the DGs of the microgrid, and using a droop based controller to guide operation of each of the DGs of the microgrid.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In one aspect, the method, system, and non-transitory computer-readable storage medium include a framework for distribution network voltage regulation by integrating a solar photovoltaic (PV) system with a distributed energy storage system (ESS) and adaptively dispatching the ESS. In the exemplary embodiments of the present invention, a resiliency controller with reactive power coordination and voltage restoration strategy for microgrids is proposed based on a Model Predictive Control (MPC) methodology. The proposed controller includes two levels, that is, an MPC based reactive power distribution algorithm to distribute optimal reactive power set point to each participating distributed generator (DG) and a droop based set point tracking controller to achieve voltage restoration.

In one aspect, the method, system, and non-transitory computer-readable storage medium include utilizing existing DGs in the microgrid to realize the voltage regulation, and no additional reactive power compensation equipment is needed, which saves cost of the system. The exemplary embodiments of the present invention can further predict a possible system voltage trajectory a certain time step ahead, and utilize this information for voltage regulation. Therefore, the exemplary embodiments of the present invention can achieve a higher quality of voltage regulation. The exemplary embodiments of the present invention can, by proper distribution of reactive power, maximize usage of renewable energies and minimize usage of fossil-fuel generators. This reduces operation costs of the microgrid.

In one aspect, the method, system, and non-transitory computer-readable storage medium include a reactive power coordination and voltage restoration strategy for microgrid based on a model predictive control methodology. The proposed controller includes two levels, that is, an MPC based reactive power distribution algorithm to distribute optimal reactive power set-point to each participating DG and a droop based set-point tracking controller to achieve voltage restoration. In particular, (1) the proposed controller is able to coordinate among multiple DGs and distribute reactive power set-point in a way that cheaper sources contribute more than expensive sources for secondary voltage regulation. 2) The proposed controller utilizes a system dynamic model to predict future system behavior and then optimizes future control actions to get a better response. The control performance is better than conventional proportional integral (PI) based control methods which do not consider predictive information. 3) The proposed controller can work under long term daily based operating conditions in a microgrid. 4) A practical communication interval with at least one second can be considered in the controller design.

The exemplary embodiments of the present invention greatly reduce the cost for both electricity suppliers and customers. The examples described herein reduce the need for system maintenance, reduce the possibility of equipment failure, and reduce the needs for power curtailments and load shedding. With this invention, grid-scale energy storage can be a valuable asset for the power system for enhancing its reliability and stability.

Microgrids are electric networks that are capable of deriving power from a number of sources including the conventional power grid, localized power generating capabilities and alternative power sources such as solar arrays and wind turbines. The microgrid can aggregate power from a number of sources, converting the different formats of power derived from multiple and diverse sources to common voltage and frequency formats that can be subsequently distributed to one or a number of loads. In addition, the microgrid can maintain the reliability of power to one or a number of loads in the face of changing power levels that are derived from the multiple and diverse sources. A microgrid can be coordinated to provide power from a variety of power sources and to provide power with greater reliability. For example, a microgrid can provide an alternate source of power to a site when there is an interruption in the power delivered by the conventional utility power grid. A microgrid also can provide an alternate source of power, such as power from a renewable energy source, when renewable energy is preferred over power delivered by the conventional utility power grid. The power that the microgrid supplies to a site may be derived from a variety of sources including energy storage devices, alternative energy sources such wind or solar power, or from burning conventional fossil fuels.

Figure 1:
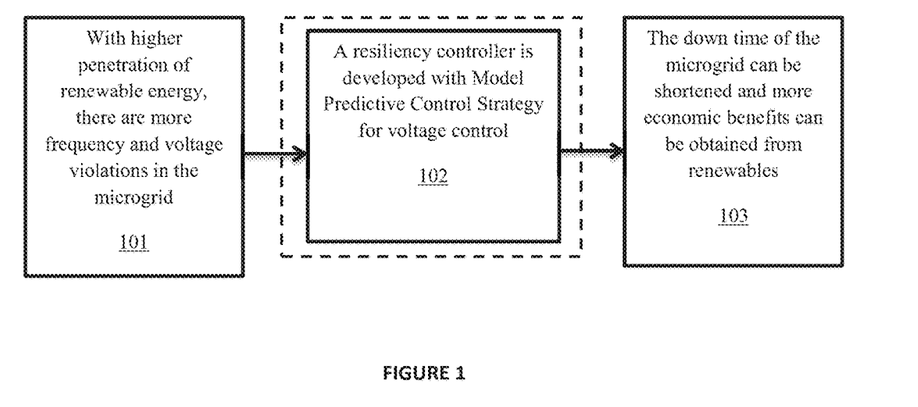
FIG. 1 is a block/flow diagram of high-level voltage regulation in a distribution system, in accordance with embodiments of the present invention.

FIG. 1 is a block/flow diagram of high-level voltage regulation in a distribution system, in accordance with embodiments of the present invention.

At block 101, with higher penetration of renewable energy, there are more frequency and voltage violations in the microgrid.

At block 102, a resiliency controller is developed with a model predictive control strategy for voltage control, according to the embodiments of the present invention.

At block 103, down time of the microgrid can be shortened and more economic benefits can be obtained from renewables.

Figure 2:
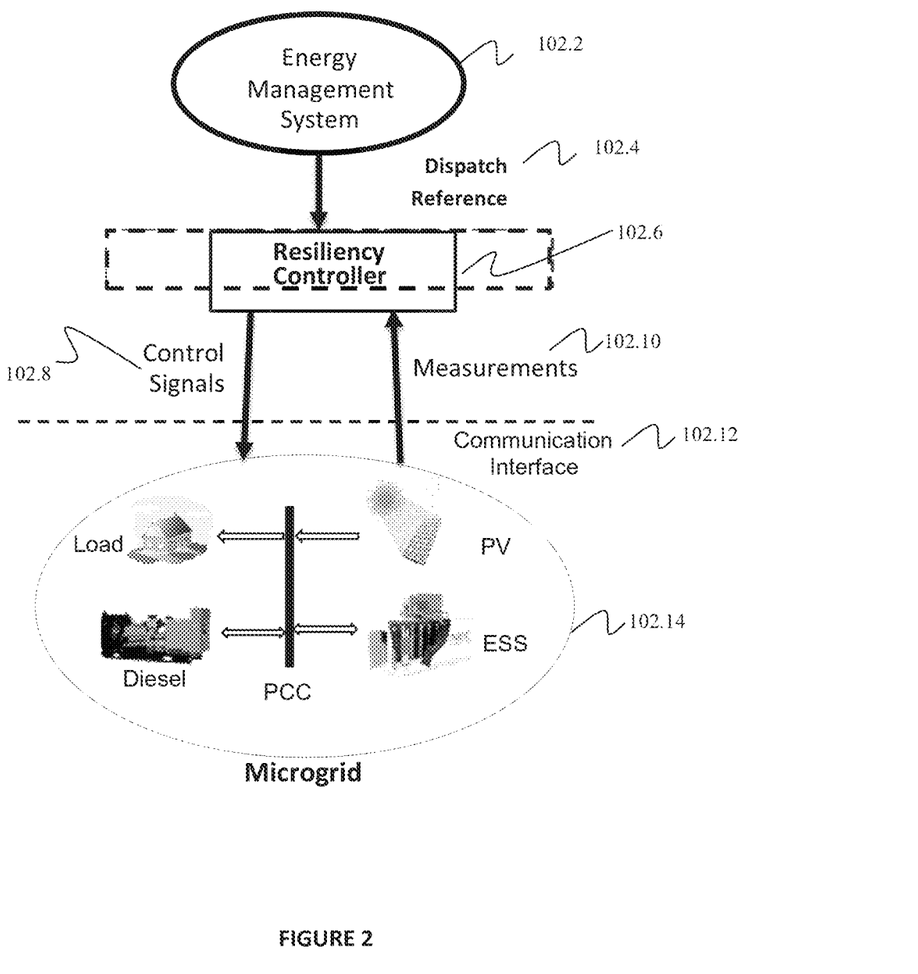
FIG. 2 is a block/flow diagram of a resiliency controller in a microgrid, in accordance with embodiments of the present invention.

In FIG. 2, 102.2 is the energy management system, which sends out the active power dispatch reference 102.4 of each distributed generator (DG) in a microgrid 102.14 to the resiliency controller 102.6. Meanwhile, the resiliency controller 102.6 collects measurement data 102.10 from the microgrid 102.14 through a communication interface 102.12. Based on the dispatch reference 102.4 and measurement data 102.10, the resiliency controller 102.6 sends out control signals 102.8 to the Distributed Generators (DGs) in the microgrid 102.14 through the same communication interface 102.12.

Regarding 102.2, the Energy Management System is in charge of the economic operation of the microgrid. The Energy Management System needs to realize functions such as unit commitment, economic dispatch, renewable forecasting, etc. The Energy Management System sends out active power dispatch references to the resiliency controller 102.6 for each DG in the microgrid 102.14.

Regarding 102.14, the DGs in the microgrid can be divided into at least three categories:

C1: Battery Energy Storage System (ESS);
C2: Traditional generators using fossil fuels, such as the diesel generator;
C3: Renewable generators, such as PV and wind;

DGs in C1 and C2 are equipped with droop control in their local controllers. DGs' output active power is related to the microgrid frequency, while DGs' output reactive power is related to the microgrid voltage.

The equations to describe these two relationships are shown below.

$$f_{DG} = f^*_{DG} + k_{f\_DG}(P^*_{DG} - P_{DG}).$$

$$V_{DG} = V^*_{DG} + k_{v\_DG}(Q^*_{DG} - Q_{DG}).$$

Where $f_{DG}$ is the output frequency of the DG, $f^*_{DG}$ is the reference frequency of the DG, $k_{f\_DG}$ is the frequency droop coefficient, $P^*_{DG}$ is the reference active power of the DG, and $P_{DG}$ is the output active power of the DG.

Meanwhile, $V_{DG}$ is the output frequency of the DG, $V^*_{DG}$ is the reference frequency of the DG, $k_{v\_DG}$ is the frequency droop coefficient, $Q^*_{DG}$ is the reference active power of the DG, and $Q_{DG}$ is the output active power of the DG.

DGs in C3 are equipped with Maximum Power Point Tracking (MPPT) algorithm to harvest the maximum amount of energy under the given weather condition. Meanwhile, they can also be equipped with droop control in their local controllers.

Figure 3:
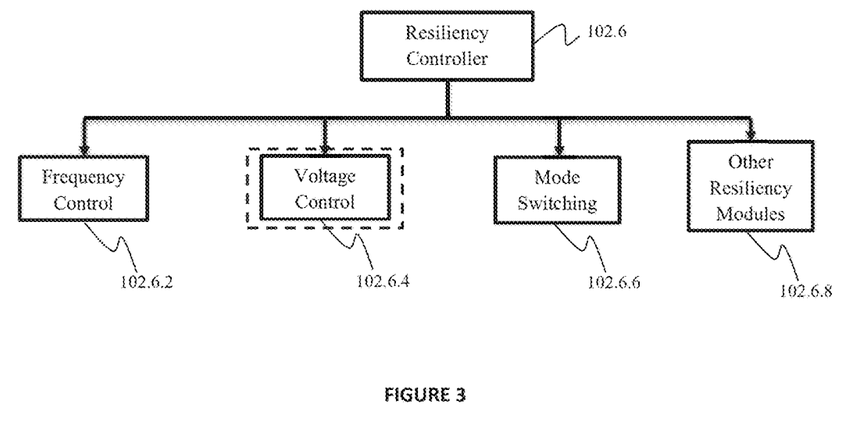
FIG. 3 is a block/flow diagram of the components of the resiliency controller of FIG. 2 in the microgrid, in accordance with embodiments of the present invention.

Regarding 102.6, the schematic of the resiliency controller is shown in FIG. 3. The resiliency controller 102.6 includes multiple functional modules to control the DGs in the microgrid 102.14 utilizing system-level information. The frequency control module 102.6.2 utilizes a dynamic droop control algorithm to regulate the microgrid frequency. The voltage control module 102.6.4 utilizes a reactive power management algorithm to regulate the microgrid voltage. The mode switching module 102.6.6 is in charge of the microgrid operation status transition between the grid-tied mode and islanded mode. In addition, there are other resiliency modules 102.6.8 to enhance the resilience of the microgrid.

Regarding 102.6.4, the voltage control module has a two-tier structure. The lower level is a local control level where each participating DG regulates the reactive power output through droop based tracking. The upper level is a global control level, and the optimal reactive power set points of each DG are determined with consideration of reactive power availability. The control objective is to regulate critical load bus voltage and at the same time distribute reactive power set point to maximize usage of a renewable DG and minimize usage of fossil-fuel generators, thus reducing operational costs.

Figure 4:
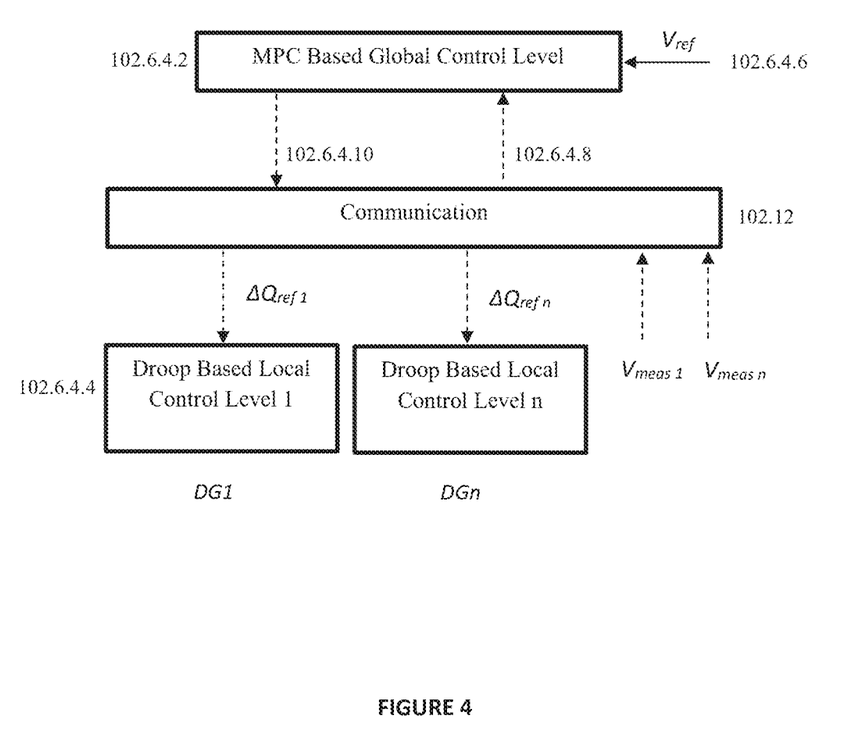
FIG. 4 is a block/flow diagram of a voltage control unit in the resiliency controller of FIG. 2, in accordance with embodiments of the present invention.

The schematic of the voltage control module is shown in FIG. 4. 102.6.4.2 is an MPC based global control level/module, while 102.6.4.6 is a droop based local control level/module. The global control level gets the system reference voltage $V_{ref}$ 102.6.4.6 and at the same time collects voltage information 102.6.4.8 at different locations of microgrid 102.14. These locations are usually critical AC buses or critical loads in the microgrid 102.14. The voltage information is sent to the global control level through the communication interface 102.12.

After collecting the reference voltage and the feedback voltage information, the global control level computes the optimal reactive power reference 102.6.4.10 for each DG in the microgrid 102.14. The optimal reactive power reference is then sent out to the local control level 102.6.4.4 of each DG in the microgrid through the same communication interface 102.12. In the local control level, a droop based reactive control algorithm is implemented.

Figure 5:
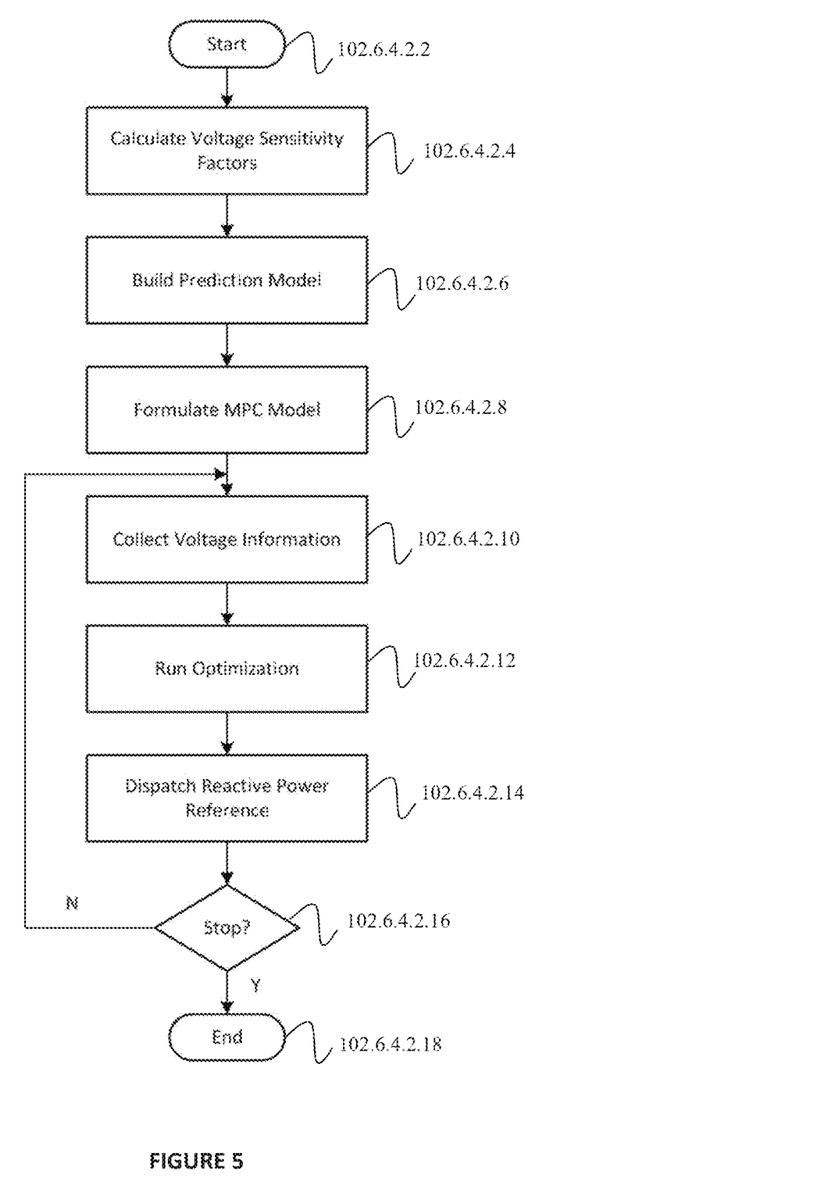
FIG. 5 is a block/flow diagram of a global control level, in accordance with embodiments of the present invention.

Regarding 102.6.4.2, the flow chart for the MPC based global control level is shown in FIG. 5. When the controller is initially implemented in a microgrid, it needs to customize the system model. The voltage sensitivity factors are first calculated to estimate a relationship between reactive power change and voltage change for each DG 102.6.4.2.4. Then the prediction model for each DG is estimated 102.6.4.2.6, so the behavior of the system can be predicted in the controller. The MPC model then can be formulated for the specific microgrid 102.6.4.2.8. During operation, the controller first collects the system voltage and the reference voltage 102.6.4.2.10. Then, it runs the optimization to obtain the reactive power references for each DG 102.6.4.2.12 and send the information to the local control level of each DG 102.6.4.2.14. If there is no stop command, the controller repeats the same procedure, starting from collecting voltage information.

Regarding 102.6.4.2.4, in order to obtain system prediction model, voltage sensitivity analysis is used to connect bus voltage deviation with reactive power contribution.

The power flow equation in the microgrid can be listed as:

$$\begin{cases} P_i = \sum_{k=1}^{m} |V_i||V_k|(G_{ik}\cos(\theta_i - \theta_k) + B_{ik}\sin(\theta_i - \theta_k)) \\ Q_i = \sum_{k=1}^{m} |V_i||V_k|(G_{ik}\sin(\theta_i - \theta_k) - B_{ik}\cos(\theta_i - \theta_k)) \end{cases}$$

where m is the number of buses in the microgrid;
$P_i$ and $Q_i$ are the real and reactive power at bus i, respectively;
$G_{ik}$ and $B_{ik}$ are the conductance and susceptance of the line admittance between bus i and k, respectively;
$V_i$ and $V_k$ are the voltage magnitude at bus i and bus k, respectively; and
$\theta_i$ and $\theta_j$ are the voltage phase angle of bus i and bus k, respectively.

The Jacobian matrix is obtained by linearizing the power flow equations:

$$\begin{bmatrix} \Delta P \\ \Delta Q \end{bmatrix} = \begin{bmatrix} \frac{\partial P}{\partial \theta} & \frac{\partial P}{\partial V} \\ \frac{\partial Q}{\partial \theta} & \frac{\partial Q}{\partial V} \end{bmatrix} \begin{bmatrix} \Delta \theta \\ \Delta V \end{bmatrix}$$

By inverting the Jacobian matrix, the voltage sensitivity matrix can be derived as:

$$\begin{bmatrix} \Delta \theta \\ \Delta V \end{bmatrix} = \begin{bmatrix} \frac{\partial P}{\partial \theta} & \frac{\partial P}{\partial V} \\ \frac{\partial Q}{\partial \theta} & \frac{\partial Q}{\partial V} \end{bmatrix}^{-1} \begin{bmatrix} \Delta P \\ \Delta Q \end{bmatrix}$$

Assume the active power is constant, the voltage magnitude deviation at bus i can be calculated as:

$$\Delta V_i = \sum_k D_{ik} \Delta Q_k$$

$$\text{where } D = \left(\frac{\partial Q}{\partial V} - \frac{\partial Q}{\partial \theta}\left(\frac{\partial Q}{\partial \theta}\right)^{-1}\frac{\partial P}{\partial V}\right)^{-1},$$

and $D_{ik}$ is the sensitivity factor representing the derivation of voltage at bus i caused by the derivation of reactive power at bus k.

Based on the above, voltage sensitivity factors can also be estimated by regression techniques if power flow equation parameters cannot be easily obtained.

Regarding 102.6.4.2.6, MPC controller utilizes the system's model as a prediction model to predict future system behavior. The system model should be simple, yet still able to capture the system's major dynamics. The high dimensionality of a detailed full model of the DG sources increases a computational burden of the MPC controller. Thus, simplified models of sources of major dynamics representing "snapshots" of the system are obtained to reduce model dimensionality and at the same time allow for actual data identification. Since only reactive power output is of interest, a first order input-output transfer function based model representing a relationship between reactive power set point and reactive power output can be utilized as a prediction model:

$$\Delta Q_{gi} = \sum_i^n \frac{K_{Q,i}}{1 + T_{Q,i}} \Delta Q_{st,i}$$

Regarding 102.6.4.2.8, based on the system information, the MPC objective is formulated as follows:

$$J(V, Q, k) = \sum_{k=1}^{N_p-1}\left(\sum_{i=1}^{N}\|V_{m,i}(t+k\Delta t \mid t) - V_{ref,i}(t)\|_2 + \sum_{i=1}^{n}\|\omega_i \Delta Q_i(t)\|_2\right)$$

where $V_{m,i}$ is the voltage measurement of bus i,
$V_{ref,i}$ is the voltage reference of bus i,
N is the total number of buses that voltage control requirements such as critical load bus, $N_p$ is the user defined prediction horizon,
$\omega_i$ is the weighting factor for DG i,
$\Delta Q_i$ is the reactive power contribution requirement of DG i adding to nominal set point,
while n is the total number of DG participating in voltage control.

The constraints are defined as follows:

$$Q_{i,min} \leq Q_i^{Nom} + \Delta Q \leq Q_{i,max}, \quad i=1, \ldots, n$$

$$V_{i,min} \leq |V_{m,i}| \leq V_{i,max}, \quad i=1, \ldots, N$$

Figure 6:
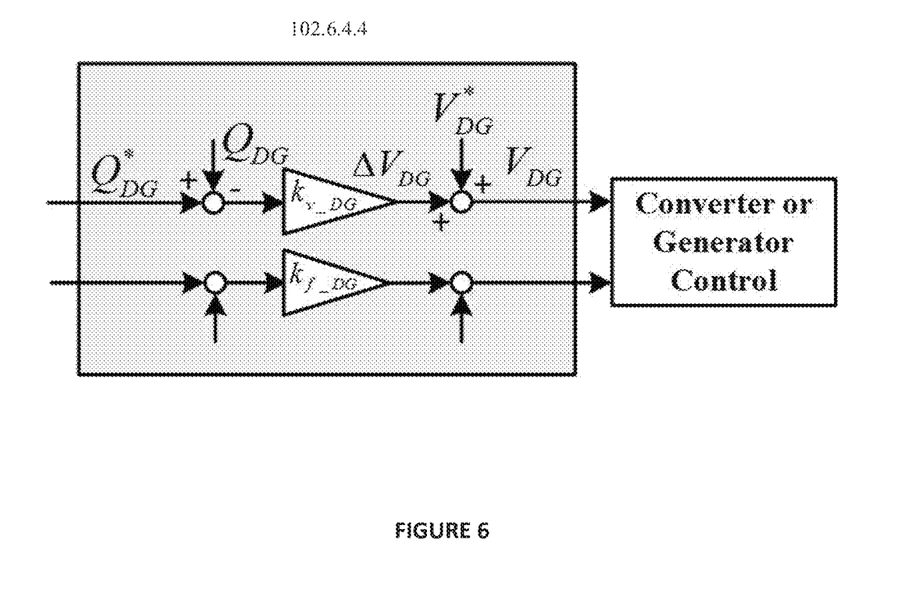
FIG. 6 is a block/flow diagram of a local control level, in accordance with embodiments of the present invention.

Regarding 102.6.4.4, at the local control level, droop based voltage control is utilized to coordinate with the global level control. The schematic of the droop based local control level is shown in FIG. 6. The reactive power reference $Q^*_{DG}$ is sent from the global control level through the communication interface. It is subtracted by the output reactive power of the DG $Q_{DG}$ measured locally, and an error signal is multiplied by a reactive power droop coefficient $k_{v\_DG}$ to generate a voltage modification value $\Delta V_{DG}$. $\Delta V_{DG}$ is added together with the reference of the voltage DG $V^*_{DG}$ to generate an output voltage command of the DG $V_{DG}$.

The frequency droop branch is not used in this case and is thus not discussed herein.

Figure 7:
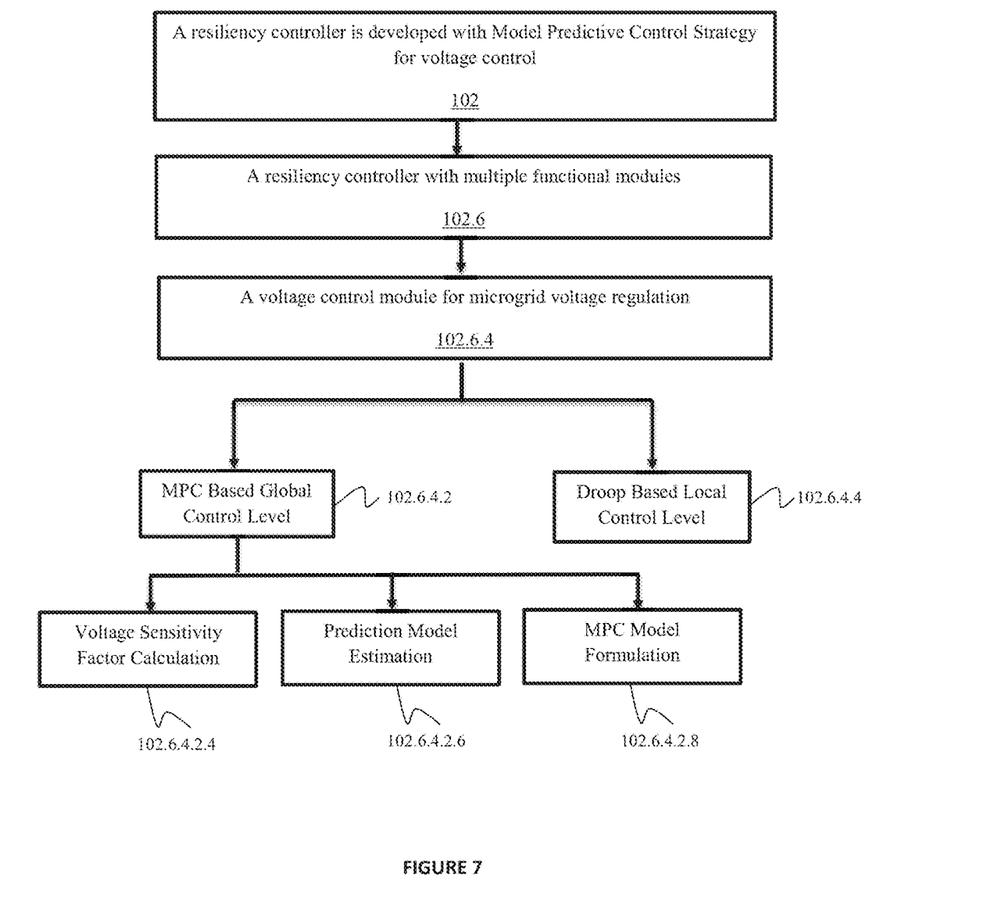
FIG. 7 is a block/flow diagram of a method for regulating voltage via a resiliency controller including a model predictive control (MPC) based global control level and a droop based local control level, in accordance with embodiments of the present invention.

FIG. 7 is a block/flow diagram of a method for regulating voltage via a resiliency controller including a reactive power estimator and a dynamic droop control unit, in accordance with embodiments of the present invention.

At block 102, a resiliency controller is developed with a reactive power dispatch algorithm for voltage control.

At block 102.6, the resiliency controller is provided with multiple functional modules.

At block 102.6.4, the resiliency controller includes at least a voltage control module for microgrid voltage regulation.

At block 102.6.4.2, the voltage control module includes an MPC based global control level.

At block 102.6.4.4, the voltage control module includes a droop based local control level.

The MPC based global control level 102.6.4.2 further includes a voltage sensitivity factor calculation 102.6.4.2.4, a prediction model estimation 102.6.4.2.6, and an MPC model formulation 102.6.4.2.8.

Therefore, the steps of the exemplary embodiments of the present invention are: 1) collect the system-level information of the microgrid, 2) use MPC based reactive power control strategy to optimally distribute the reactive power in the microgrid, and 3) utilize local droop control technology to guide the operation of each DG in the microgrid.

In summary, voltage control is a fundamental requirement to ensure secure operation of a microgrid, especially for islanded microgrids with large amounts of renewable energy resources. The exemplary embodiments propose a two-level reactive power coordination and voltage restoration strategy for a microgrid by using a model predictive control (MPC) approach. At a supervisory level, a reactive power set point of each participating distributed generation source (DER) is calculated and distributed through a communication link, while at a primary level, a droop based controller is utilized to control each participating DER to follow a reactive power set-point provided by the supervisory level. One advantage of the proposed method is that it takes system dynamic models into consideration and is able to predict a possible voltage trajectory a certain time step ahead. Another advantage of the proposed method is that the controller is able to calculate a reactive power mismatch and to coordinate each DER to provide reactive power compensation for voltage regulation. The controller is implemented in both offline simulation platforms and real-time simulation platforms to verify control performance under various loading conditions with multiple time scales.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Additionally, as used herein, the term "exemplary" is intended to mean serving as an illustration or example of something, and is not intended to indicate a preference.

As used herein, the terms "component", "agent", and "system" are intended to encompass computer-readable data storage that is configured with computer-executable instructions that cause certain functionality to be performed when executed by a processor. The computer-executable instructions may include a routine, a function, or the like. In another example, a "component", "agent", or "system" may be hardware that is configured to perform certain functionality, such as a field programmable gate array (FPGA), an embedded processor interfaced to a power control hardware device, or the like. It is also to be understood that a component, agent, or system may be localized on a single device or distributed across several devices.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method executed on a processor for controlling voltage fluctuations of a microgrid including a plurality of distributed generators (DGs), the method comprising:

collecting, by a resiliency controller, measurement data from the microgrid, the resiliency controller including a voltage control module having a droop-based local control level and a model predictive control (MPC) based global control level;

determining, at the MPC based global control level, optimal reactive power set points of each of the DGs based on reactive power availability;

transmitting the optimal reactive power set points of each of the DGs, via a communication interface, to the droop-based local control level; and regulating, at the droop-based local control level, via the plurality of DGs, reactive power output through droop-based tracking;

wherein the MPC based global control level enables voltage sensitivity factor determination, prediction model estimation, and MPC model formulation.

2. The method of claim 1, wherein the resiliency controller further includes a frequency control module and a mode switching module.

3. The method of claim 2, wherein the voltage control module is executed by a reactive power distribution algorithm for distributing the reactive power to each of the DGs of the microgrid.

4. The method of claim 2, wherein the frequency control module utilizes a droop based controller to regulate a microgrid frequency.

5. The method of claim 2, wherein the mode switching module controls microgrid operation status transition between grid-tied mode and islanded mode.

6. The method of claim 1, wherein, at MPC based global control level, voltage sensitivity factors are used to estimate a relationship between reactive power change and voltage change for each of the DGs of the microgrid.

7. The method of claim 6, wherein a prediction model for each of the DGs of the microgrid is estimated to predict a behavior of an energy management system in communication with the microgrid via the resiliency controller.

8. The method of claim 6, wherein the voltage sensitivity factors involve power flow calculations given by:

$$\begin{cases} P_i = \sum_{k=1}^{m} |V_i||V_k|(G_{ik}\cos(\theta_i - \theta_k) + B_{ik}\sin(\theta_i - \theta_k)) \\ Q_i = \sum_{k=1}^{m} |V_i||V_k|(G_{ik}\sin(\theta_i - \theta_k) - B_{ik}\cos(\theta_i - \theta_k)) \end{cases}$$

where m is the number of buses in the microgrid, $P_i$ and $Q_i$ are the real and reactive power at bus i, respectively, $G_{ik}$ and $B_{ik}$ are the conductance and susceptance of the line admittance between bus i and k, respectively, $V_i$ and $V_k$ are the voltage magnitude at bus i and bus k, respectively; and $\theta_i$ and $\theta_k$ are the voltage phase angle of bus i and bus k, respectively.

9. The method of claim 1, wherein the MPC model formulation is given as:

$$J(V, Q, k) = \sum_{k=1}^{N_p-1} \left( \sum_{i=1}^{N} \|V_{m,i}(t + k\Delta t \mid t) - V_{ref,i}(t)\|_2 + \sum_{i=1}^{n} \|\omega_i \Delta Q_i(t)\|_2 \right)$$

where $V_{m,i}$ is the voltage measurement of bus i, $V_{ref,i}$ is the voltage reference of bus i, N is the total number of buses that voltage control requirements such as critical load bus, $N_p$ is the user defined prediction horizon, $\omega_i$ is the weighting factor for DG i, $\Delta Q_i$ is the reactive power contribution requirement of DG i adding to nominal set point, and n is the total number of DG participating in voltage control.

10. A system for controlling voltage fluctuations of a microgrid including a plurality of distributed generators (DGs), the system comprising:
a memory; and
a processor in communication with the memory, wherein the processor is configured to:
collect, by a resiliency controller, measurement data from the microgrid, the resiliency controller including a voltage control module having a droop-based local control level and a model predictive control (MPC) based global control level;
determine, at the MPC based global control level, optimal reactive power set points of each of the DGs based on reactive power availability;
transmit the optimal reactive power set points of each of the DGs, via a communication interface, to the droop-based local control level; and
regulate, at the droop-based local control level, via the plurality of DGs, reactive power output through droop-based tracking;
wherein the MPC based global control level enables voltage sensitivity factor determination, prediction model estimation, and MPC model formulation.

11. The system of claim 10, wherein the resiliency controller includes a frequency control module and a mode switching module.

12. The system of claim 11, wherein the voltage control module is executed by a reactive power distribution algorithm for distributing the reactive power to each of the DGs of the microgrid.

13. The system of claim 11, wherein the frequency control module utilizes a droop based controller to regulate a microgrid frequency.

14. The system of claim 11, wherein the mode switching module controls microgrid operation status transition between grid-tied mode and islanded mode.

15. The system of claim 10, wherein, at MPC based global control level, voltage sensitivity factors are used to estimate a relationship between reactive power change and voltage change for each of the DGs of the microgrid.

16. The system of claim 15, wherein a prediction model for each of the DGs of the microgrid is estimated to predict a behavior of an energy management system in communication with the microgrid via the resiliency controller.

17. The system of claim 15, wherein voltage sensitivity factors involve power flow calculations given by:

$$\begin{cases} P_i = \sum_{k=1}^{m} |V_i||V_k|(G_{ik}\cos(\theta_i - \theta_k) + B_{ik}\sin(\theta_i - \theta_k)) \\ Q_i = \sum_{k=1}^{m} |V_i||V_k|(G_{ik}\sin(\theta_i - \theta_k) - B_{ik}\cos(\theta_i - \theta_k)) \end{cases}$$

where m is the number of buses in the microgrid, $P_i$ and $Q_i$ are the real and reactive power at bus i, respectively, $G_{ik}$ and $B_{ik}$ are the conductance and susceptance of the line admittance between bus i and k, respectively, $V_i$ and $V_k$ are the voltage magnitude at bus i and bus k, respectively; and $\theta_i$ and $\theta_j$ are the voltage phase angle of bus i and bus k, respectively.

18. The system of claim 10, wherein the the MPC model formulation is given as:

$$J(V, Q, k) = \sum_{k=1}^{N_p-1} \left( \sum_{i=1}^{N} \|V_{m,i}(t + k\Delta t \mid t) - V_{ref,i}(t)\|_2 + \sum_{i=1}^{n} \|\omega_i \Delta Q_i(t)\|_2 \right)$$

where $V_{m,i}$ is the voltage measurement of bus i, $V_{ref,i}$ is the voltage reference of bus i, N is the total number of buses that voltage control requirements such as critical load bus, $N_p$ is the user defined prediction horizon, $\omega_i$ is the weighting factor for DG i, $\Delta Q_i$ is the reactive power contribution requirement of DG i adding to nominal set point, and n is the total number of DG participating in voltage control.

19. A non-transitory computer-readable storage medium comprising a computer-readable program for controlling voltage fluctuations of a microgrid including a plurality of distributed generators (DGs), wherein the computer-readable program when executed on a computer causes the computer to perform the steps of:
collecting, by a resiliency controller, measurement data from the microgrid, the resiliency controller including a voltage control module having a droop-based local control level and a model predictive control (MPC) based global control level;
determining, at the MPC based global control level, optimal reactive power set points of each of the DGs based on reactive power availability;
transmitting the optimal reactive power set points of each of the DGs, via a communication interface, to the droop-based local control level; and
regulating, at the droop-based local control level, via the plurality of DGs, reactive power output through droop-based tracking;
wherein the MPC based global control level enables voltage sensitivity factor determination, prediction model estimation, and MPC model formulation.

20. The non-transitory computer-readable storage medium of claim 19,
wherein the MPC model formulation is given as:

$$J(V, Q, k) = \sum_{k=1}^{N_p-1} \left( \sum_{i=1}^{N} \|V_{m,i}(t + k\Delta t \mid t) - V_{ref,i}(t)\|_2 + \sum_{i=1}^{n} \|\omega_i \Delta Q_i(t)\|_2 \right)$$

where $V_{m,i}$ is the voltage measurement of bus i, $V_{ref,i}$ is the voltage reference of bus i, N is the total number of buses that voltage control requirements such as critical load bus, $N_p$ is the user defined prediction horizon, $\omega_i$ is the weighting factor for DG i, $\Delta Q_i$ is the reactive power contribution requirement of DG i adding to nominal set point, and n is the total number of DG participating in voltage control.

* * * * *